United States Patent [19]

Suzuki

[11] Patent Number: 4,841,736
[45] Date of Patent: Jun. 27, 1989

[54] METHOD FOR CONTROLLING THE OPERATION OF A VARIABLE DISPLACEMENT REFRIGERANT COMPRESSOR FOR A CAR AIR-CONDITIONER

[75] Inventor: Shinichi Suzuki, Kariya, Japan

[73] Assignee: Kabushiki Kaisha Toyoda Jidoshokki Seisakusho, Aichi, Japan

[21] Appl. No.: 209,705

[22] Filed: Jun. 22, 1988

[30] Foreign Application Priority Data

Jun. 29, 1987 [JP] Japan .................. 62-163236

[51] Int. Cl.$^4$ .................. F25B 1/02; F04B 1/28
[52] U.S. Cl. .................. 62/133; 62/227; 62/228.5; 417/53; 417/222
[58] Field of Search .................. 62/133, 227, 228.5; 417/222 S, 53

[56] References Cited

U.S. PATENT DOCUMENTS

| | | | |
|---|---|---|---|
| 4,492,527 | 1/1985 | Swain | 417/222 S |
| 4,507,932 | 4/1985 | Suzuki | 62/227 |
| 4,533,299 | 8/1985 | Swain | 417/222 S |
| 4,669,272 | 2/1987 | Kawai | 62/217 |

FOREIGN PATENT DOCUMENTS

| | | |
|---|---|---|
| 56-112314 | 9/1981 | Japan . |
| 57-191118 | 11/1982 | Japan . |
| 162087 | 8/1985 | Japan .................. 417/222 S |
| 2153922 | 8/1985 | United Kingdom .................. 417/222 S |

Primary Examiner—William L. Freeh
Attorney, Agent, or Firm—Burgess, Ryan and Wayne

[57] ABSTRACT

A method for controlling the operation of a variable displacement refrigerant compressor arranged in a car air-conditioner circuit and driven by a car engine via a solenoid clutch is carried out in a manner such that, when either an air-conditioner OFF signal or an ignition OFF signal is received by a control device having a CPU unit therein prior to a start of a long time stoppage of the car, a displacement varying wobble plate element is always moved angularly to a predetermined position to obtain a minimum displacement condition of the compressor so that the compressor is restarted from the minimum displacement condition when the car is restarted after a long time stoppage thereof.

2 Claims, 3 Drawing Sheets

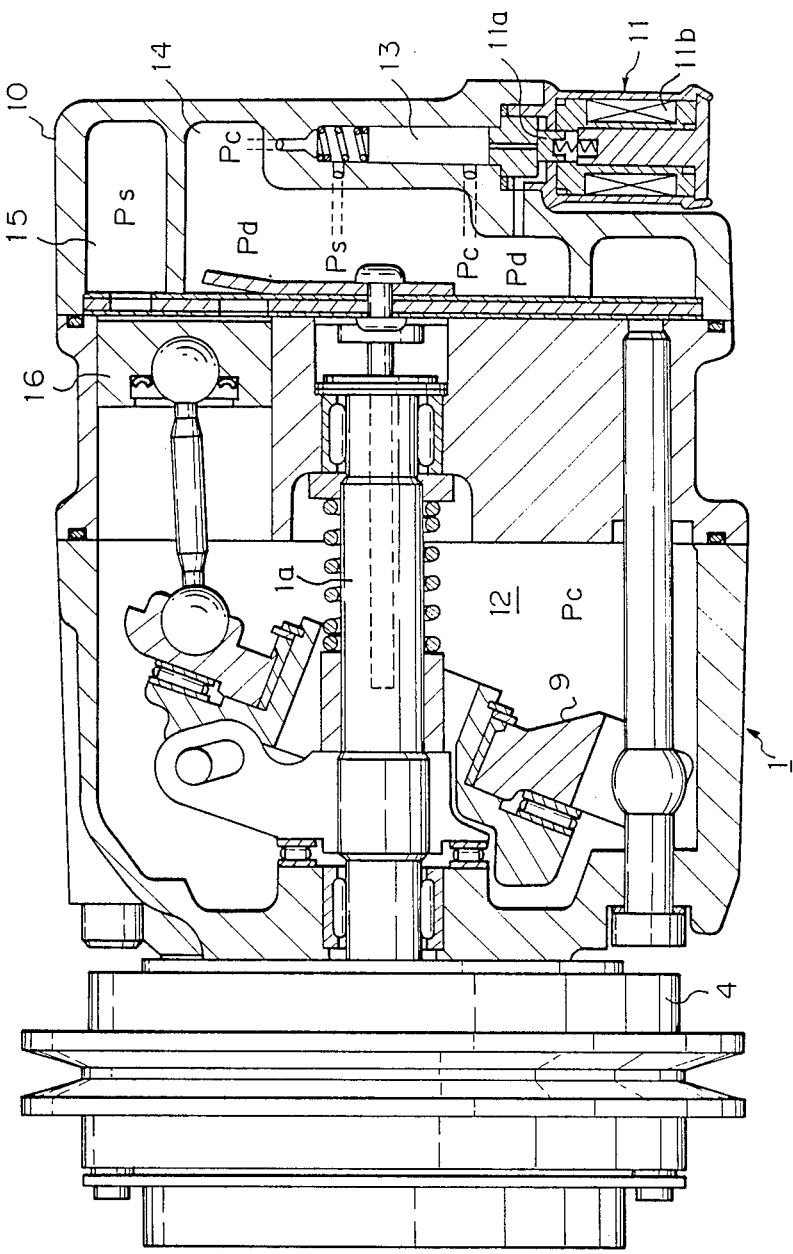

METHOD FOR CONTROLLING THE OPERATION OF A VARIABLE DISPLACEMENT REFRIGERANT COMPRESSOR FOR A CAR AIR-CONDITIONER

BACKGROUND OF THE INVENTION

1. Field of the Invention

The present invention relates to a method for controlling the operation of a variable displacement refrigerant compressor, especially a variable displacement wobble plate type compressor accommodated in a car-conditioner and driven by a car engine via a solenoid clutch. More particularly, it relates to a method for controlling the operation of a variable displacement wobble plate type compressor accommodated in a car air-conditioner by which an acceleration of a car engine is not adversely affected when starting the car after stopping or parking the car for a long period of time.

2. Description of the Related Art

Generally, a variable displacement refrigerant compressor accommodated in a car air-conditioner is driven by a car engine via a solenoid clutch, and therefore, when the car is to be started or accelerated, a large load due to inertia of the car per se, and an additional load due to the inertia of the variable displacement refrigerant compressor of a car air-conditioner, are simultaneously applied to a car engine, and accordingly, the acceleration of the car engine is adversely affected.

Japanese Unexamined Patent Publication No. 56-112314 discloses a measure for solving such problems of the conventional car air-conditioner. Namely, a device is employed to monitor a negative pressure level in a car engine, and when the device detects that the negative pressure level of the car engine has dropped much lower than a predetermined level, due to an acceleration of the car, a solenoid clutch arranged between the car engine and a variable displacement refrigerant compressor is disconnected to stop the operation of the compressor. Thus, an application of an additional load to the car engine can be prevented, and therefore, an acceleration of the car engine is not adversely affected. Nevertheless, after completion of the acceleration of the car, when the solenoid clutch is connected to drive the refrigerant compressor, the operation of the compressor is immediately started under a large displacement or capacity condition, and therefore, a large load is instantly applied to the car engine. As a result, a large corresponding torque is transmitted from the car engine to the compressor, and slippage of the solenoid clutch occurs, which shortens the life of the solenoid clutch. Also, the shock of the above-mentioned instant application of a large load to the car engine is transmitted to the car driver.

Japanese Unexamined Patent Publication No. 57-191118 discloses a proposal for a control device to solve the above problems encountered by the latter conventional car air-conditioner incorporating therein a variable displacement compressor. Namely, the control device reduces a displacement of a variable displacement refrigerant compressor to a minimum level by driving a displacement changing element of the compressor immediately the starting switch or ignition switch of the car is turned ON. But, when the control device is applied to a car air-conditioner including a wobble plate type variable displacement refrigerant compressor as disclosed in, for Example, U.S. Pat. No. 4,688,997 to Suzuki et al, and incorporating therein a non-rotary wobble plate capable of changing the angular position thereof to vary the stroke of pistons and thereby vary the compressor displacement, a problem arises in that, since the angular position of the wobble plate is controlled and determined by a dynamic relationship between a pressure prevailing within a crankcase of the compressor, a pressure prevailing in a discharge chamber of the compressor, and a force of a return spring acting to return the wobble plate to a predetermined position, it takes a long time for the wobble plate to move to the minimum displacement position from the other displacement positions. Namely, an immediate move of the wobble plate to an erect position thereof at which the piston stroke becomes smallest does not take place, and as a result, when the car engine is operated to start the car, it is in practice difficult to start the car with a good acceleration from a stop thereof.

SUMMARY OF THE INVENTION

An object of the present invention is obviate the defects encountered by the above various conventional methods and devices for controlling the operation of variable displacement compressors for car air-conditioners.

Another object of the present invention is to provide a novel method for controlling the operation of a variable displacement type compressor, especially a variable displacement wobble plate type compressor for a car air-conditioner.

In accordance with the present invention, there is provided a method for controlling the operation of a variable displacement refrigerant compressor incorporating therein a displacement varying means, and an actuating means for actuating the displacement varying means and arranged to be driven, by an engine of a car via a solenoid clutch, in a closed refrigerant circuit of a car air-conditioner including a refrigerant gas condenser connected to the compressor, a refrigerant receiver connected to the refrigerant gas condenser, an expansion valve connected to the refrigerant receiver, an evaporator connected to the expansion valve and to the compressor, and a control means connected to the actuating means of the compressor for controlling the displacement of the compressor, comprising the steps of: supplying an OFF-indication signal from at least one of an air-conditioner drive switch and an ignition switch, arranged to be operated by a driver of the car, to the control means when the car is to be stopped to thereby cause the control means to issue a predetermined control signal for operating the actuating means at a predetermined operating condition; and moving the displacement varying means to a predetermined position, whereat the minimum displacement of the compressor is reached, in response to the predetermined operating condition of the actuating means.

BRIEF DESCRIPTION OF THE DRAWINGS

The above and other objects, features and advantages of the present invention will be made apparent from the ensuing description of the preferred embodiment with reference to the accompanying drawings wherein:

FIG. 3 is a longitudinal cross-sectional view of a variable displacement wobble plate type compressor accommodated in the air-conditioner of FIG. 1.

DESCRIPTION OF THE PREFERRED EMBODIMENTS

Figure 1:
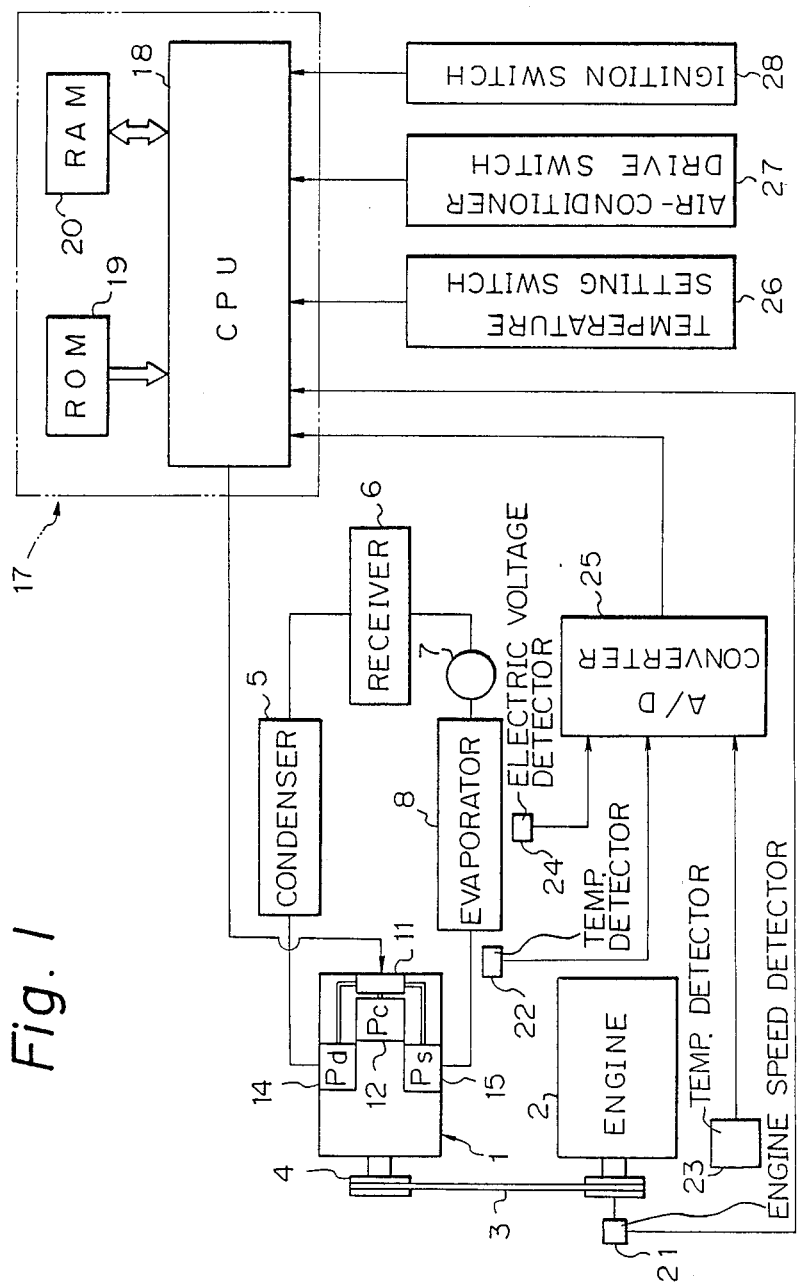
FIG. 1 is a schematic block diagram of a car air-conditioner embodying the present invention.

Referring to FIG. 1, a car air-conditioner includes a variable displacement refrigerant compressor 1 driven by a car engine 2 via a belt-pulley transmission mechanism 3 and a solenoid clutch 4, which is electro-magnetically connected and disconnected to drive and stop the compressor 1. The air-conditioner also includes a condenser 5 for condensing a compressed refrigerant discharged from the compressor 1, a receiver 6 for receiving a condensed refrigerant delivered from the condenser 5, an expansion valve 7, and an evaporator 8 for a heat-exchange, these elements being connected to one another in series.

Preferably, the variable displacement refrigerant compressor 1 is a variable displacement wobble plate type compressor 1, as illustrated in FIG. 3, having a non-rotatable and angularly displacable wobble plate 9 and a solenoid-operated control valve 11 arranged within a rear head 10 to cause an angular displacement of the wobble plate 9.

In FIG. 3, the solenoid-operated control valve 11 is provided with a valve element 11a which is moved axially by an energization and de-energization of the solenoid 11b and controls a pressure Pc in a crankcase chamber 12 within which the above-mentioned wobble plate 9 is mounted around a drive shaft 1a rotated by a car engine. When the valve element 11a of the solenoid-operated control valve 11 is moved by the solenoid 11b, a corresponding movement of a spool valve 13 occurs, to cause the fluid communication between the crankcase chamber 12 (pressure Pc) and a discharge chamber 14 (pressure Pd), and that between the crankcase chamber 12 and a suction chamber 15 (pressure Ps), to be switched. As a result, an amount of high pressure refrigerant gas flowing from the discharge chamber 14 toward the crankcase chamber 12 is regulated, to thereby adjust a pressure Pc within the crankcase chamber 12, and therefore, vary the angular position of the wobble plate 9. A change in the angular position of the wobble plate 9 causes an increase and decrease of an axial stroke of each piston 16, which in turn varies the displacement of the compressor. At this stage, the energization and de-energization of the solenoid 11b of the solenoid-operated control valve 11 are controlled by a duty ratio control method briefly described in, e.g., U.S. Pat. No. 4,747,754 to Fujii et al, under the control of an externally arranged control device 17 schematically shown in FIG. 1.

Referring again to FIG. 1, the control device 17 includes a central processing unit (hereinafter referred to as a CPU) 18, a program memory 19 comprising a read-only-memory (ROM) storing therein control programs, and an operating memory 20 comprising a random access memory temporarily storing a result of an operation of the CPU 18. The CPU 18 has input terminals receiving, either directly or via an A/D converter 25, output signals sent by an engine-rotation detector (a tachometer) 21, a temperature detector 22 monitoring and detecting a temperature at an outlet of the evaporator 8, an ambient temperature detector 23, and an electric voltage detector 24 detecting an electric voltage applied to a fan of the evaporator 8. The CPU 18 of the control device 17 is provided with an additional input terminal to receive an output signal from a temperature setting switch 26, which outputs a signal in correspondence to a desired temperature of air blowing through the evaporator 8 into a compartment of a car. Upon receiving the signal output by the temperature setting switch 26, in addition to the signals output by the above-mentioned various detectors 21 through 24, the CPU 18 calculates the optimum control variables to be set for a feedback control system including the variable displacement wobble plate type compressor 1 and the solenoid-operated control valve 11. The operation of the CPU 18 includes a calculation of a duty ratio of the solenoid 11b of the solenoid-operated control valve 11 which is suitable for obtaining an optimum displacement of the wobble plate type compressor. The solenoid 11b is energized by the calculated duty ratio. The line extending from the CPU 18 of the control device 17 to the solenoid-operated control valve 11 in FIG. 1 indicates an electric drive line for supplying electric power in accordance with the calculated duty ratio.

The CPU 18 of the control device 17 has other input terminals for receiving OFF signals from an air-conditioner drive switch 27 and an ignition switch (or an ignition key) 28 usually disposed in the driver's compartment of a car. Accordingly, when the CPU 18 receives an OFF signal from either the air-conditioner drive switch 27 or the ignition switch 28, the CPU 18 delivers a predetermined output signal from the ROM 19 to the solenoid 11b, so that the wobble plate 9 (FIG. 2) is angularly displaced to a predetermined position whereat a minimum displacement of the wobble plate type compressor 1 is realized.

Figure 2:
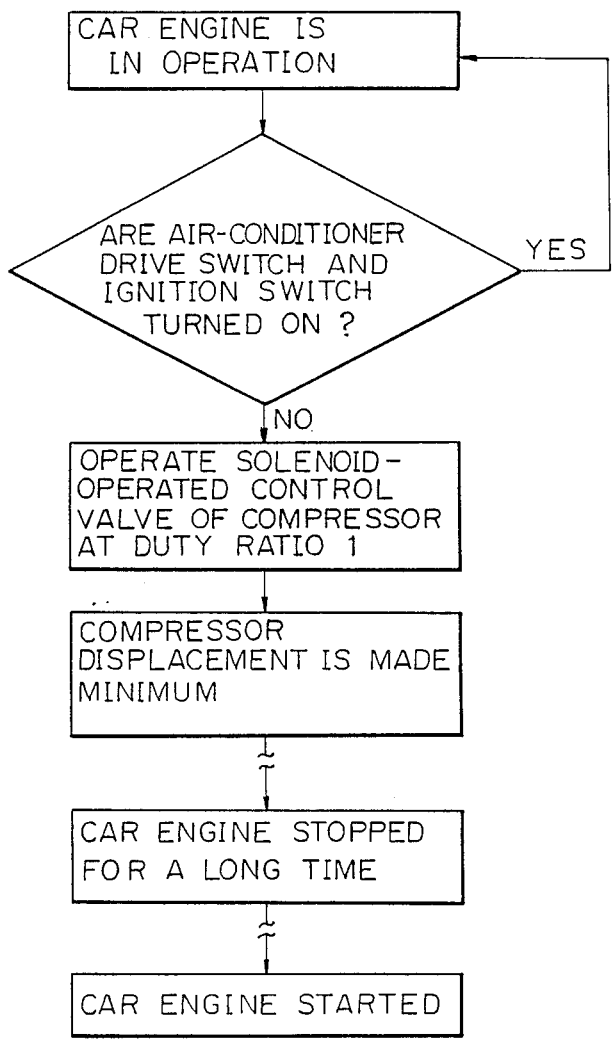
FIG. 2 is an operational flow chart of a controller incorporated in the air-conditioner of FIG. 1.

The operation of the air-conditioner of FIGS. 1 and 3 will be described hereinbelow with reference to the flow chart of FIG. 2, in addition to FIGS. 1 and 3.

While a car is driven with the air-conditioner thereof as illustrated in FIGS. 1 and 3 driven by the engine of the car, the CPU 18 of the control device 17 constantly receives signals from the detectors 21 through 24, and in turn, controls the duty ratio of the solenoid-operated control valve 11 of the wobble plate type compressor 1 to operate the compressor 1 at a displacement optimal for achieving a desired temperature condition in the driver's compartment thereof.

On the other hand, when the driver of the car turns either one of the air-conditioner drive switch 27 and the ignition switch 28, or both of the switches 27 and 28, OFF when the car is to be stopped for a long period of time, an OFF signal or signals are supplied to the CPU 18 of the control device 17, to inform the CPU 18 that the switches 27 and 28 are not turned ON. Upon receipt of an OFF signal or signals, the CPU 18 immediately issues a drive signal to operate and control the solenoid-operated control valve 11 at the duty ratio 1, and as a result, the wobble plate 9 of the wobble plate type compressor 1 is moved to an angular position whereat fluid communication between the crankcase chamber 12 and the discharge chamber 14 of the compressor 1 is established, and the pressure Pc within the crankcase chamber 12 and the pressure Pd within the discharge chamber 14 are in equilibrium, and thus the displacement of the wobble plate type compressor 1 is rapidly brought to the minimum level. Therefore, when the car is started after stopping for a long time, the operation of the variable displacement wobble plate type compressor 1 is always started from a predetermined condition such that the displacement thereof is at the minimum, and thus the car can be rapidly and smoothly accelerated from a stopped state, due to a low load from the air-conditioner.

When the acceleration of the car has lasted for a predetermined period of time, or when the car reaches a predetermined operation condition such that a rate of change in the crankshaft rotation speed of the engine becomes a negative value, the CPU 18 stops the control operation by which the variable displacement refrigerant compressor 1 is driven under the minimum displacement condition, and controls the operation of the compressor 1 by the afore-mentioned ordinary method on the basis of the signals from the detectors 21 through 24. Note, as soon as the minimum displacement operation of the compressor 1 is discontinued, the operation of the compressor 1 is rapidly brought from the minimum to the maximum displacement operation, to lower the temperature in the driver's compartment. This is because the minimum displacement operation of the compressor 1 during the above-described initial accelerating stage of the car causes a gradual increase of the temperature in the driver's compartment, and when the car compartment is cooled, the operation of the compressor 1 is changed by the CPU 18 of the control device 17 from the maximum to an optimum displacement operation.

Although not illustrated in FIG. 1, it is possible to provide a signal line between the solenoid clutch 4 and the control device 17 so that, when the solenoid clutch 4 is accidentally disconnected or disconnected by the driver, a signal indicating an OFF state of the solenoid clutch 4 is supplied to the CPU 18, which then immediately controls the solenoid-operated control valve 11 and rapidly varies the displacement of the compressor 1 to the minimum displacement condition, and accordingly when the connection of the solenoid clutch 4 is restored, a shock due to a large displacement operation of the compressor 1 will not occur, and therefore, the mechanical life of the solenoid clutch can be prolonged.

From the foregoing description of the preferred embodiment of the present invention, it will be understood that according to the present invention, when a car having an air-conditioner which includes a variable displacement refrigerant compressor is started after a long time stoppage, the car is started and accelerated under a condition such that the operation of the compressor is always started from the minimum displacement condition thereof, and thus an excessive load is not applied by the air-conditioner on the car engine. Therefore, the car can be always smoothly and rapidly accelerated at an initial starting of the car after a long time stoppage thereof.

I claim:

1. A method of controlling the operation of a variable displacement refrigerant compressor incorporating therein a displacement varying means, and an actuating means for actuating the displacement varying means and arranged to be driven, by an engine of a car via a solenoid clutch, in a closed refrigerant circuit of a car air-conditioner including a refrigerant gas condenser connected to the compressor, a refrigerant receiver connected to the refrigerant gas condenser, an expansion valve connected to the refrigerant receiver, an evaporator connected to the expansion valve and to the compressor, and a control means operatively connected to the actuating means of the compressor for controlling the displacement of the compressor, comprising the steps of:

supplying an OFF-indication signal from at least one of an air-conditioner drive switch and an ignition switch, arranged to be operated by a driver of the car, to the control means when the car is to be stopped to thereby cause the control means to issue a predetermined control signal for operating the actuating means at a predetermined operating condition; and moving the displacement varying means to a predetermined position whereat a minimum displacement of the compressor is obtained in response to the predetermined operating condition of the actuating means, said control means comprising a CPU unit connected to said air-conditioner drive switch and said ignition switch, respectively, for carrying out a predetermined calculation to issue said control signal to be supplied to said actuating means of said compressor, a ROM unit for storing therein programmed data to permit said CPU unit to carry out said predetermined calculation and issue said predetermined control signal when said CPU unit receives said OFF-indication signal, and a RAM unit for temporarily storing a result of said predetermined calculation carried out by said CPU unit, said CPU Unit of said control means further receiving a desired temperature indication signal for said car air-conditioner from a temperature setting switch operated by the driver, and at least an electric signal indicating a temperature of air blowing from said evaporator to thereby carry out a calculation for issuing another control signal different from said predetermined control signal and driving said actuating means until said displacement varying means is moved to a position whereat the displacement of said compressor is optimum, for achieving said desired temperature while said car is driven.

2. The method according to claim 1, wherein said displacement varying means comprises a non-rotatable angularly displacable wobble plate operatively connected to pistons of said compressor, said actuating means comprises a solenoid-operated control valve incorporating therein a solenoid actuator, and said predetermined control signal issued from said control means comprises an electric drive signal driving said solenoid of said solenoid-operated control valve at a duty ratio 1.

* * * * *